(12) United States Patent
Vinogradov

(10) Patent No.: US 8,757,494 B2
(45) Date of Patent: Jun. 24, 2014

(54) ILLUMINATION SYSTEM IN IMAGING SCANNER

(75) Inventor: Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/245,967

(22) Filed: Sep. 27, 2011

(65) Prior Publication Data

US 2013/0075474 A1   Mar. 28, 2013

(51) Int. Cl.
*G06K 7/10* (2006.01)
*G06K 7/14* (2006.01)

(52) U.S. Cl.
USPC ............ 235/462.42; 235/454; 235/462.14; 235/462.37; 235/462.41; 235/462.43

(58) Field of Classification Search
USPC ......... 235/462.01, 462.14, 462.42, 462.11, 235/462.24, 462.41, 462.45, 472.01, 454
See application file for complete search history.

(56) References Cited

U.S. PATENT DOCUMENTS

| | | | |
|---|---|---|---|
| 5,189,291 A * | 2/1993 | Siemiatkowski | 235/462.45 |
| 5,420,411 A * | 5/1995 | Salatto et al. | 235/462.22 |
| 5,637,854 A * | 6/1997 | Thomas | 235/462.14 |
| 5,721,464 A * | 2/1998 | Dibbern et al. | 310/358 |
| 5,751,464 A * | 5/1998 | Yoshikawa et al. | 359/208.1 |
| 5,801,869 A * | 9/1998 | Yoshikawa et al. | 359/208.1 |
| 6,254,003 B1 * | 7/2001 | Pettinelli et al. | 235/454 |
| 2001/0019104 A1 * | 9/2001 | Ohkawa et al. | 250/234 |
| 2004/0114205 A1 * | 6/2004 | Richman et al. | 359/205 |
| 2005/0116044 A1 * | 6/2005 | Zhu et al. | 235/462.45 |
| 2006/0007362 A1 * | 1/2006 | Lee et al. | 348/744 |
| 2008/0294462 A1 * | 11/2008 | Nuhaan et al. | 705/3 |
| 2009/0250615 A1 * | 10/2009 | Oldham et al. | 250/362 |
| 2010/0302516 A1 * | 12/2010 | Rehn | 353/99 |

* cited by examiner

*Primary Examiner* — Tuyen K Vo
(74) *Attorney, Agent, or Firm* — Nong-Qiang Fan

(57) ABSTRACT

A barcode imaging reader includes a housing, a window in the housing, and an imaging sensor having an array of photosensitive elements for capturing light passing through the window. The barcode imaging reader further includes an illumination arrangement for emitting an illumination light from the housing interior to illuminate a barcode target object spaced from the housing. The illumination arrangement includes (i) an illumination source within the housing operative to generate the illumination light during imaging capture, (ii) a first mirror having a shape of a toroidal surface with predominantly concave surface, and (iii) a second mirror having a shape of a toroidal surface with predominantly convex surface.

19 Claims, 12 Drawing Sheets

ILLUMINATION SYSTEM IN IMAGING SCANNER

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. A imaging sensor generally includes a plurality of photosensitive elements or pixels aligned in one or more arrays. Examples of imaging sensors include charged coupled devices (CCD) or complementary metal oxide semiconductor (CMOS) imaging chips.

FIG. 1A and FIG. 1B depict an imaging slot scanner 50 in accordance with some embodiments. The imaging slot scanner 50 has a window 56 and a housing 58. The imaging slot scanner 50 is typically a portable reader that has a base for supporting itself on a flat surface 30, such as, a countertop. The window 56 generally faces an operator at the workstation. As shown in FIG. 1A, the operator can slide or swipe the product 40 past the window 56 from right to left, or from left to right, in a "swipe" mode, to let an image of the barcode 40 on the product 42 be captured by the imaging slot scanner 50. Alternatively, the operator can present the barcode 40 on the product 42 to the center of the window 56 in a "presentation" mode. The choice depends on operator preference or on the layout of the workstation. In an imaging slot scanner it is necessary to illuminate the FOV of the imaging camera at a substantial angle to be able to position the illumination system as high as possible to the top of the scanner. It allows hiding the illumination system and minimizing the user exposure to the bright illumination. However it creates challenge to redirect efficiently the light towards the camera imaging FOV. It is generally desirable to reduce light variation from the top to the bottom at the near field close to the window and to increase the range of working distances within which the barcode 40 can be successfully decoded.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
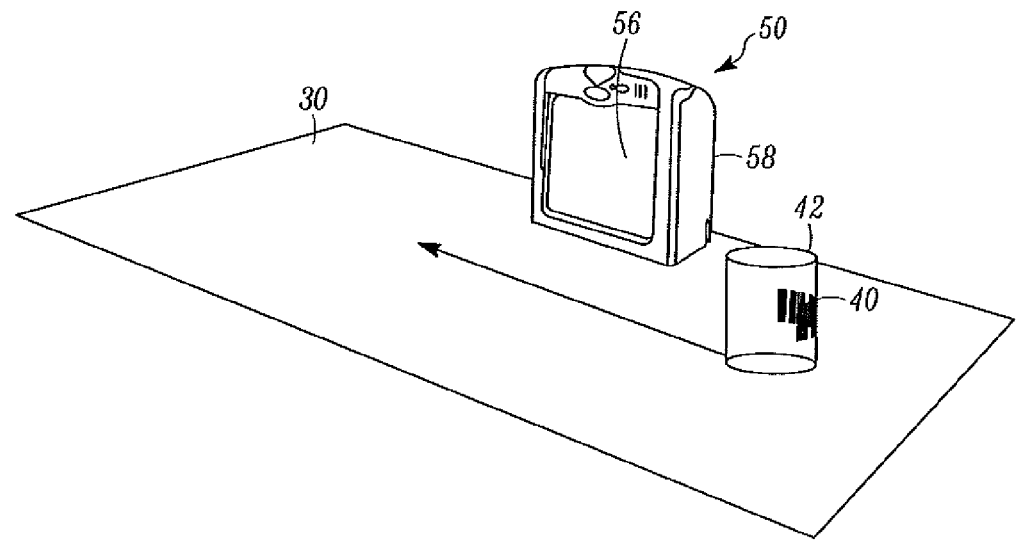
FIG. 1A and FIG. 1B depict an imaging slot scanner in accordance with some embodiments.
Figure 1A:
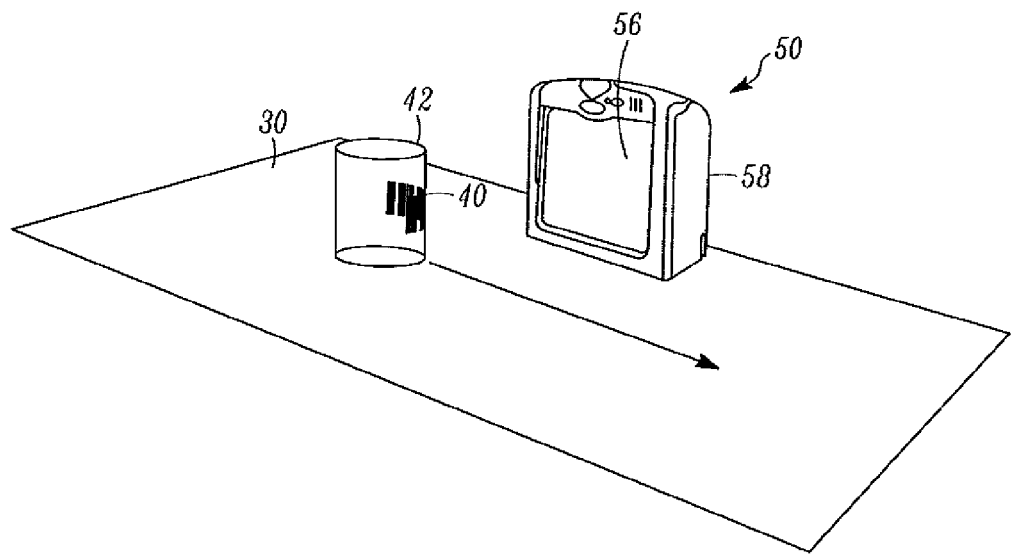
Figure 1B:
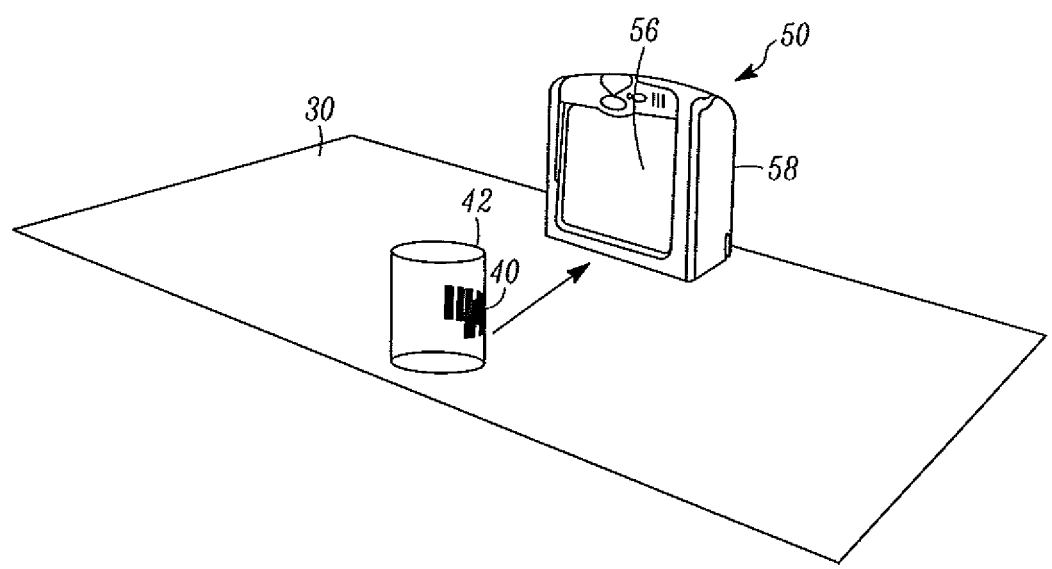

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An illumination arrangement for emitting an illumination light from the housing interior to illuminate a barcode target object spaced from the housing. The illumination arrangement includes (i) an illumination source within the housing operative to generate the illumination light during imaging capture, (ii) a first mirror having a shape of a toroidal surface with predominantly concave surface, and (iii) a second mirror having a shape of a toroidal surface with predominantly convex surface. The first mirror is located within the housing at a position generally facing the illumination source and the second mirror, and the first mirror is configured for reflecting at least a portion of the light emitted by the illumination source toward the second mirror. The second mirror is located within the housing at a position generally facing the first mirror and the window, and the second mirror is configured for reflecting at least a portion of the light received from the first mirror toward the window.

Figure 2:
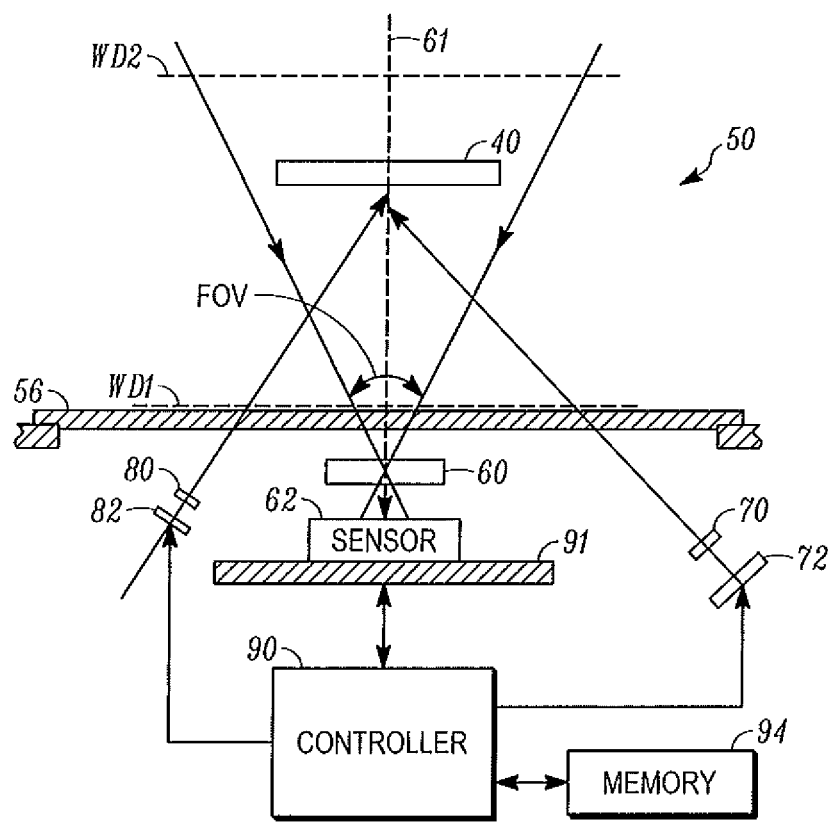
FIG. 2 is a schematic of an imaging scanner in accordance with some embodiments.

FIG. 2 is a schematic of an imaging slot scanner 50 in accordance with some embodiments. The imaging slot scanner 50 in FIG. 2 includes the following components: (1) an imaging sensor 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens assembly 60 along an optical path or axis 61 through the window 56. Generally, the imaging sensor 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the imaging sensor 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the imaging sensor 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging slot scanner 50 includes a memory 94 that can be accessible by the controller 90 for storing and retrieving data. In many embodiments, the controller 90 also includes a decoder for decoding one or more barcodes that are within the field of view (FOV) of the imaging slot scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
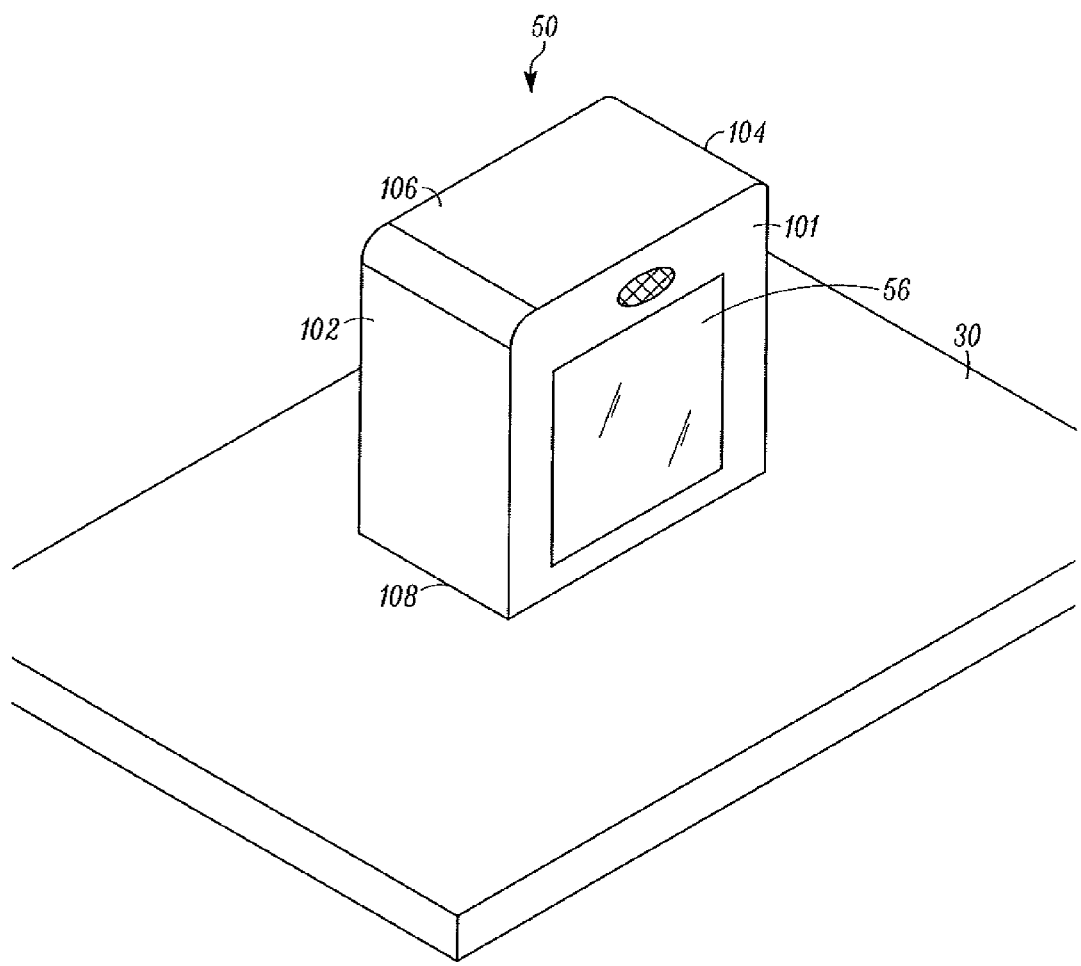
FIG. 3 and FIG. 4 depict an imaging slot scanner in accordance with some embodiments.
Figure 4:
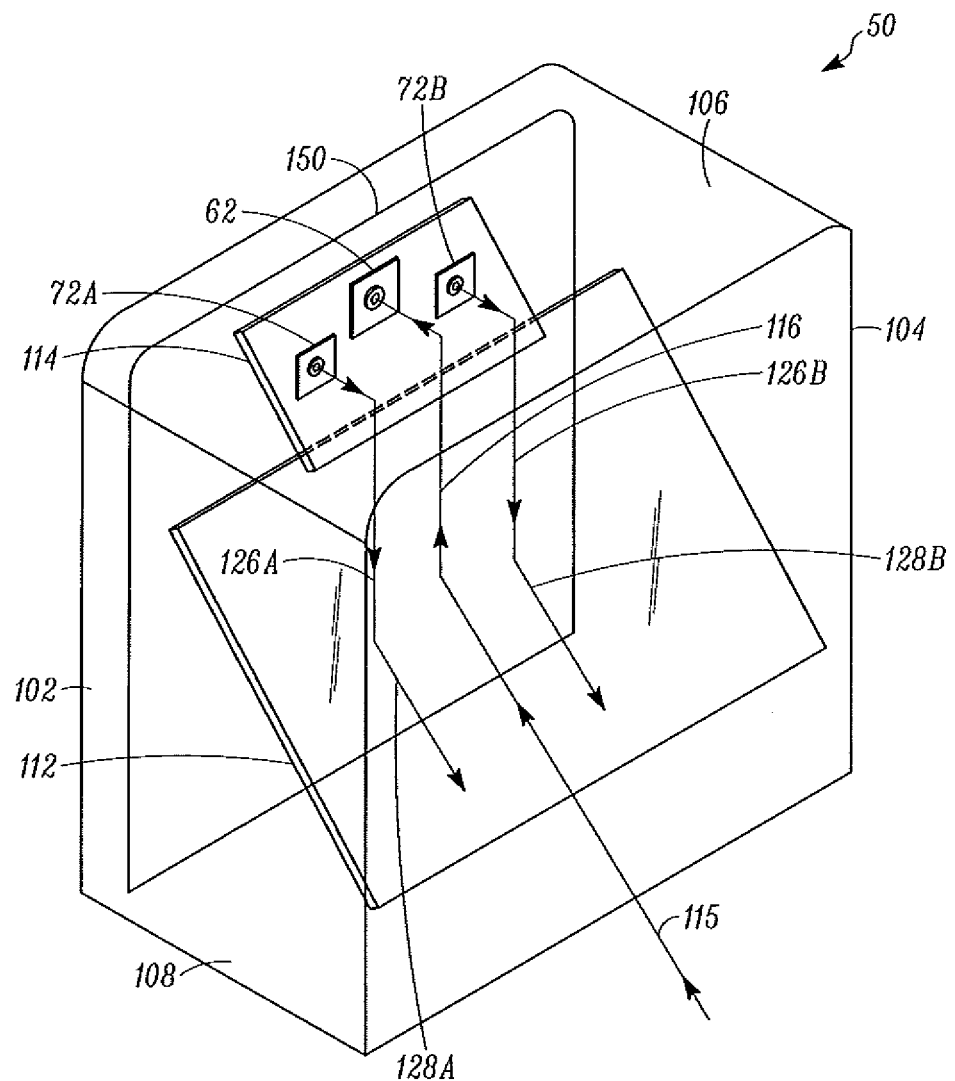

FIG. 3 and FIG. 4 depict an imaging slot scanner 50 in accordance with some embodiments. The imaging slot scanner 50 includes a portable housing configured for standing on top of a flat surface 30. The imaging slot scanner 50 has a front face 101 that is bounded by a first side wall 102, a second side wall 104, a top wall 106, and a bottom wall 108. In some preferred implementations, the distance between the first side wall 102 and the second side wall 104 is less than 20 cm. The majority part of the front face 101 is covered with a window 56. In some implementations, the window 56 is configured to be substantially parallel to the front face 101. In other implementations, the window 56 can be titled with respect to the front face 101.

The imaging slot scanner 50 also includes a circuit board 150 located inside the portable housing. The circuit board 150 is substantially parallel to the front face 101. In some implementations, the distance between the circuit board 150 and the front face 101 is between 10-20 centimeters. The imaging sensor 62 and illumination sources 72A and 72B are all installed on the circuit board 150. The imaging sensor 62 having an array of photosensitive elements is configured to capture light passing through the window 56 that is received from an imaging filed-of-five (FOV). Each of the illumination sources 72A and 72B can include one or more Light Emitting Diodes (LEDs).

Figure 5:
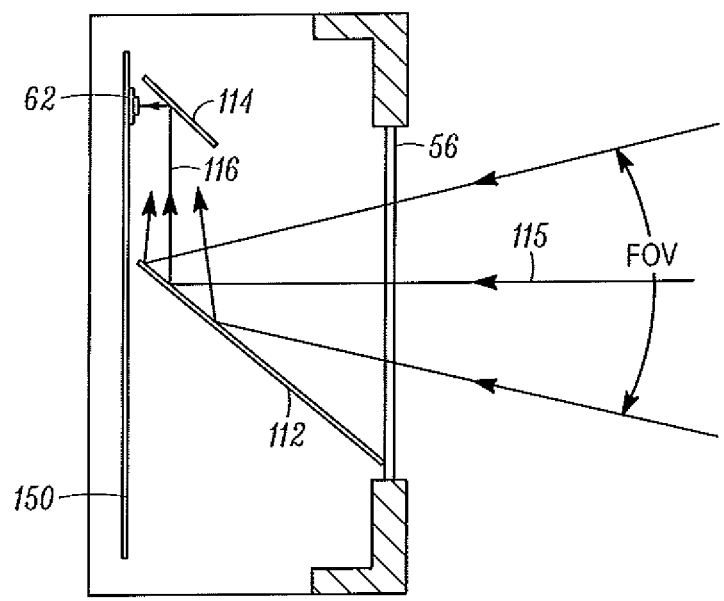
FIG. 5 shows that the supplementary mirror is configured to reflect light received from the primary mirror onto the imaging sensor in accordance with some embodiments.

As shown in FIG. 4, the imaging slot scanner 50 also includes a primary fold fold mirror 112 and a supplementary fold fold mirror 114. The first primary fold mirror 112 is configured generally facing the window 56 (as shown in FIG. 3 but not shown in FIG. 4), and the supplementary fold mirror 114 is positioned atop the imaging sensor 62 relative to the circuit board 150. As shown in FIG. 4 and FIG. 5, the primary fold mirror 112 is configured to redirect light 115 received from the imaging field of view FOV onto the supplementary fold mirror 114. The supplementary fold mirror 114 is configured to reflect light 116 received from the primary fold mirror 112 onto the imaging sensor 62.

Figure 6:
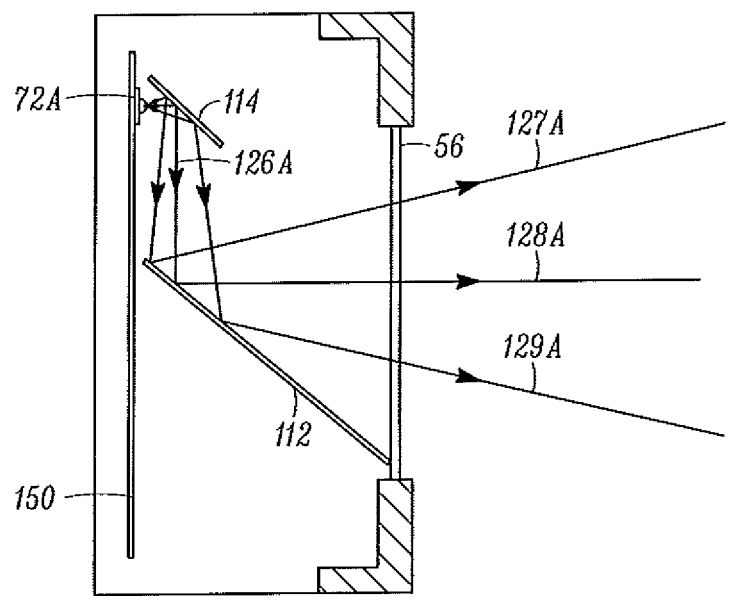
FIG. 6 shows that light emitted from illumination source is reflected by a supplementary mirror and a primary mirror to form the illumination light in accordance with some embodiments.

As shown in FIGS. 4 and 6, light emitted from illumination source 72A is reflected by the supplementary fold mirror 114 as light 126A. Light 126A from the supplementary fold mirror 114 is reflected by the primary fold mirror 112 as light 128A towards the window 56. Lights emitted from illumination source 72A, after reflected by the supplementary fold mirror 114 and the primary fold mirror 112, generally exit the window 56 to form the illumination light for illuminating the barcode target objects in front of the window 56. In FIG. 6, the illumination light generally has an illumination field-of-view bounded by light ray 127A and light ray 129A. Similarly, as shown in FIG. 4, light emitted from the illumination source 72B is reflected by the supplementary fold mirror 114 as light 126B. Light 126B from the supplementary fold mirror 114 is reflected by the primary fold mirror 112 as light 128B towards the window 56. If the supplementary fold mirror 114 is fat, the entire light cone generated by the LED source sometimes may not all be captured. It may be desirable to capture the entire light cone generated by the LED source to increase the overall efficiency.

Figure 7A:
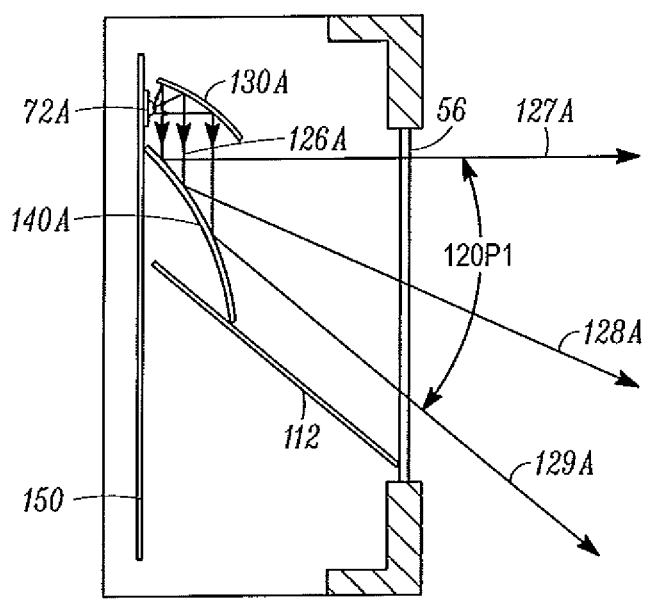
FIG. 7A shows that some of the light emitted from the illumination source can be reflected by both to the first mirror and the second mirror in accordance with some embodiments.
Figure 7B:
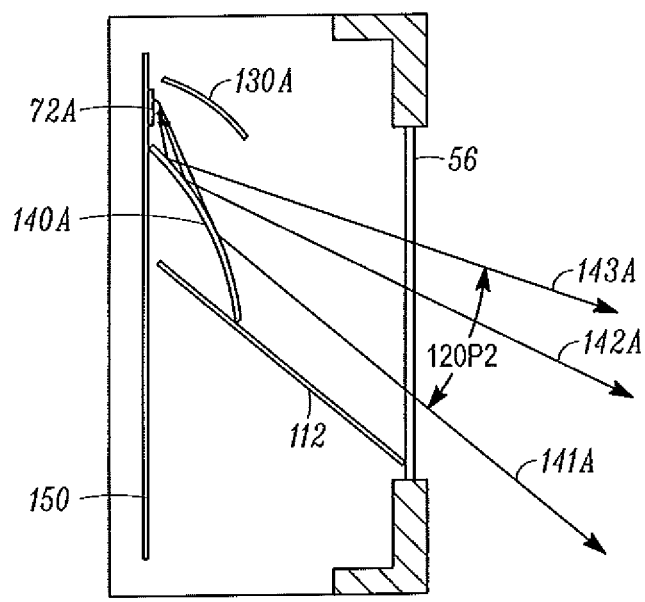
FIG. 7B shows that some of the light emitted from the illumination source can be reflected directly by the second mirror towards the window in accordance with some embodiments.
Figure 7C:
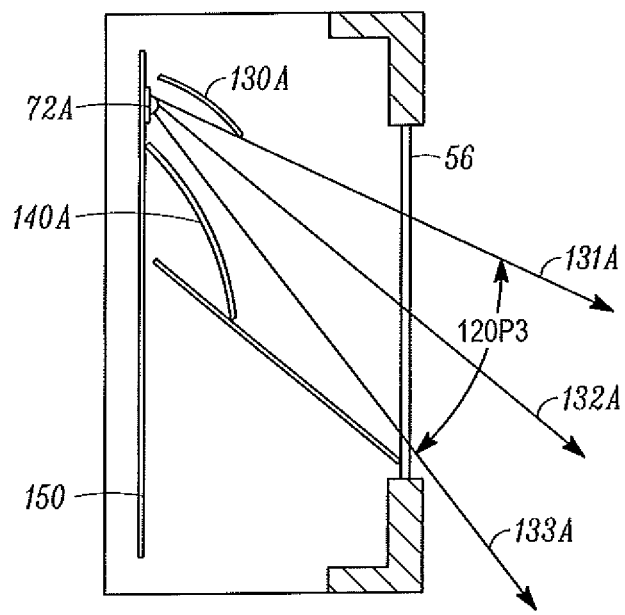
FIG. 7C shows that the illumination source can be configured to emit some of its light directly toward the window in accordance with some embodiments.

FIGS. 7A-7C depict an illumination arrangement for emitting an illumination light towards a barcode target object in accordance with some embodiments. The illumination arrangement in FIGS. 7A-7C includes (i) an illumination source 72A within the housing operative to generate the illumination light during imaging capture, (ii) a first mirror 130A having a shape of an inner toroidal surface, and (iii) a second mirror 140A having a shape of an outer toroidal surface. The first mirror 130A is located within the housing at a position generally facing the illumination source 72A and the second mirror 140A, and the first mirror 130A is configured for modifying and reflecting at least a portion of the light emitted by the illumination source 72A toward the second mirror 140A. The second mirror 140A is located within the housing at a position generally facing the first mirror 130A and the window 56, and the second mirror140A is configured for modifying and reflecting at least a portion of the light received from the first mirror 130A toward the window 56. Both the first mirror 130A and the second mirror140A can be molded as one integrated part and coated with a light reflective coating. In a preferred embodiment the first mirror 72A has a toroidal surface and has positive optical power at least along one axis. The second mirror 140A has a toroidal surface and has negative optical power at least along one axis. A particular shape of the mirrors allows to modify the emitted light distribution in the barcode plane in a desired manner, for example, for better uniformity at certain distances.

Figure 8:
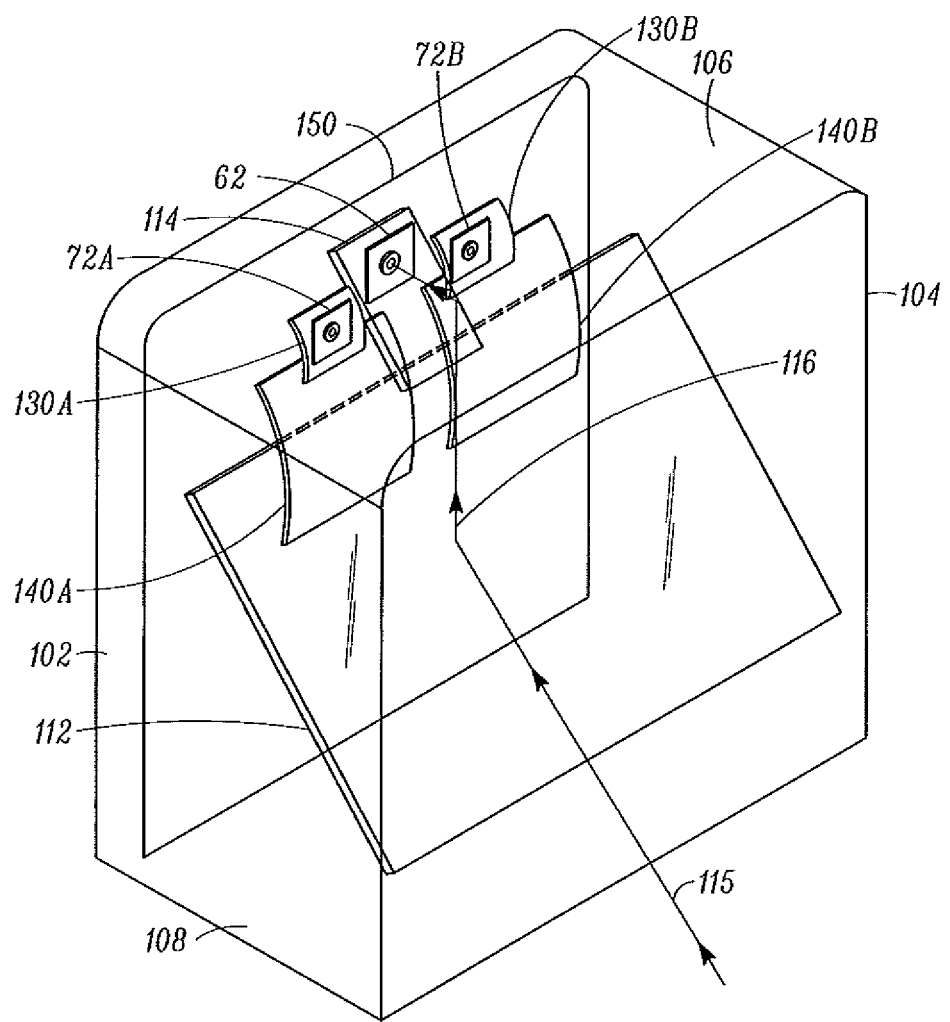
FIG. 8 shows that the supplementary mirror of FIG. 4 can be modified to leave more spaces for positioning the first mirror atop the illumination source in accordance with some embodiments.

In some implementations, as shown in FIG. 8, the supplementary fold mirror 114 of FIG. 4 can be modified to leave more spaces for positioning the first mirror 130A atop the illumination source 72A. The supplementary fold mirror 114 can still be configured to reflect light 116 received from the primary fold mirror 112 onto the imaging sensor 62. In FIG. 8, there are also extra spaces for implementing the illumination based on light emitted from the illumination source 72B, and another sets of toroidal mirrors, which would be quite similar to the first mirror 130A and the second mirror 140A implemented for the illumination source 72A.

FIG. 7A shows that some of the light emitted from the illumination source 72A can be reflected by both the first mirror 130A and the second mirror 140A in accordance with some embodiments. In FIG. 7A, some of the light emitted from illumination source 72A is reflected by the first mirror 130A as light 126A. Light 126A from the first mirror 130A is reflected by the second mirror 140A as light 128A towards the window 56. Lights emitted from illumination source 72A, after reflected by the first mirror 130A and the second mirror 140A, generally exit the window 56 as light rays within a light ray bundle bounded between light ray 127A and light ray 129A, which forms a first part 120P1 of the illumination light for illuminating the barcode target objects in front of the window 56.

FIG. 7B shows that some of the light emitted from the illumination source 72A can be reflected directly by the second mirror 140A towards the window 56 in accordance with some embodiments. In FIG. 7B, some of the light emitted from illumination source 72A is reflected directly by the second mirror 140A and exit the window 56 as light 142A within a light ray bundle bounded between light ray 141A and light ray 143A, which forms a second part 120P2 of the illumination light for illuminating the barcode target objects in front of the window 56.

FIG. 7C shows that the illumination source 72A can be configured to emit some of its light directly toward the window 56 in accordance with some embodiments. In FIG. 7B, some of the light emitted from illumination source 72A exit the window 56 directly as light 132A within a light ray bundle bounded between light ray 131A and light ray 133A, which forms a third part 120P3 of the illumination light for illuminating the barcode target objects in front of the window 56.

Figure 9:
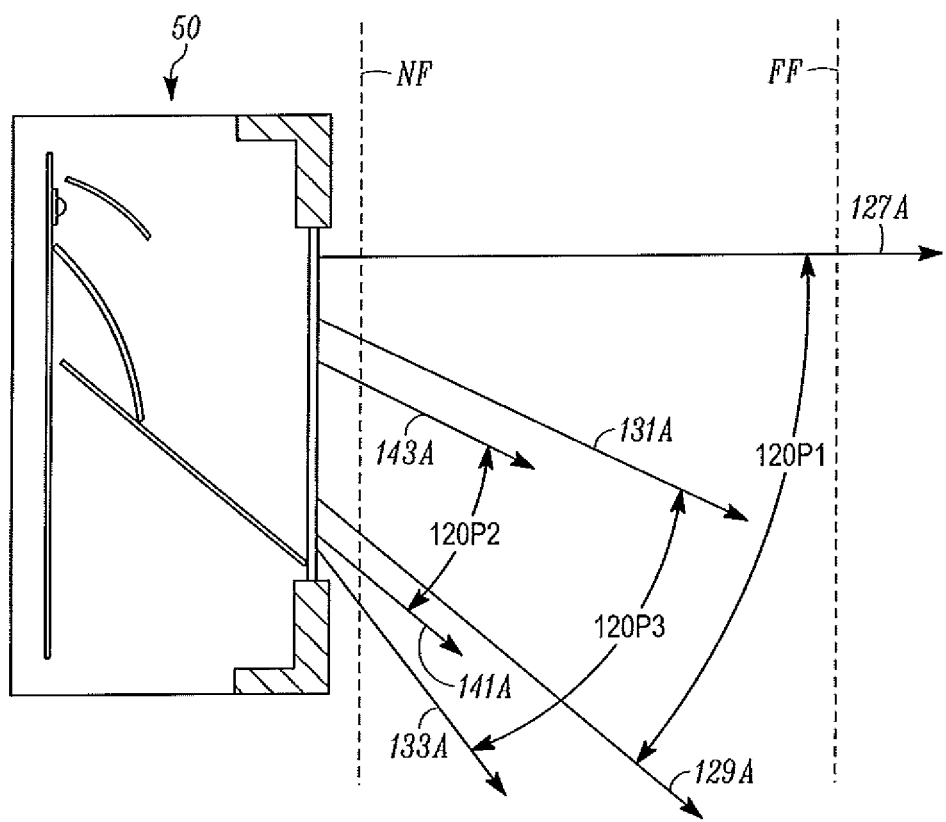
FIG. 9 shows the final light intensity distributions of the illumination light generated by the illumination arrangement as shown in FIGS. 7A-7C in accordance with some embodiments.

FIG. 9 shows the final light intensity distributions of the illumination light generated by the illumination arrangement as shown in FIGS. 7A-7C in accordance with some embodiments. The mirror arrangement in FIGS. 7A-7C allows collecting efficiently the entire cone of light from the LED. The horizontal curvature of the mirrors and aspherical terms allows to make the light distribution more uniform within the imaging FOV. When the first part 120P1, the second part 120P2, and the third part 120P3 of the illumination light (as shown respectively in FIGS. 7A, 7B, and 7C) are all combined together, light variation from the top to the bottom at the near field can be reduced. The working range of the imaging slot scanner 50 measured from the near field NF to the far field FF can be increases as well. The near field NF of the imaging camera FOV is located at the window. The far field FF is located at further distance from the scanner where the barcode can be successfully decoded.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a housing;
   a window in the housing;
   an illumination arrangement for emitting an illumination light from the housing interior to illuminate a barcode target object spaced from the housing;
   an imaging sensor having an array of photosensitive elements for capturing light scattered or reflected from the barcode target object within an imaging field of view corresponding to the imaging sensor while the barcode target object is illuminated by the illumination light having an illumination field-of-view;
   wherein the illumination arrangement comprising,
      (i) an illumination source within the housing operative to generate the illumination light during imaging capture,
      (ii) a first mirror having a shape of a toroidal surface with predominantly concave surface, and
      (iii) a second mirror having a shape of a toroidal surface with predominantly convex surface;
   wherein the first mirror is located within the housing at a position generally facing the illumination source and the second mirror, and the first mirror is configured for reflecting at least a portion of the light emitted by the illumination source toward the second mirror;
   wherein the second mirror is located within the housing at a position generally facing the first mirror and the window, and the second mirror is configured for reflecting at least a portion of the light received from the first mirror toward the window; and
   wherein the illumination source is configured to emit some light directly toward the second mirror, and wherein the second mirror is configured to reflect the light directly received from the illumination source toward the window.

2. The apparatus of claim 1, wherein the illumination arrangement is configured to emit the illumination light from the housing interior to the barcode target object within an illumination field of view that covers the imaging field of view corresponding to the imaging sensor.

3. The apparatus of claim 1, wherein the illumination source is configured to emit some light directly toward the window.

4. The apparatus of claim 1, wherein the illumination source is configured to emit some light directly toward the window.

5. The apparatus of claim 1, wherein the outer toroidal surface of the second mirror has a horizontal axis relative to the housing.

6. The apparatus of claim 1, wherein the housing includes a portable housing configured for standing on top of a flat surface with a front face bounded by a first side wall, a second side wall, a top wall and a bottom wall.

7. The apparatus of claim 6, wherein the window is located at the front face and substantially parallel to the front face.

8. The apparatus of claim 6, further comprising:
   a circuit board located inside the portable housing configured to hold the imaging sensor and the illumination source thereon, the circuit board being substantially parallel to the front face.

9. A method of reading a barcode target object comprising:
   activating an illumination source located within a housing to generate an illumination light, wherein the housing has a window therein, a first mirror therein, and a second mirror therein;
   reflecting by the first mirror at least a portion of the light emitted by the illumination source toward the second mirror, the first mirror has a shape of a toroidal surface with predominantly concave surface and located within the housing at a position generally facing the illumination source and the second mirror;
   reflecting by the second mirror at least a portion of the light received from the first mirror toward the window, wherein the second mirror has a shape of an toroidal surface with predominantly convex surface and located within the housing at a position generally facing the first mirror and the window;
   wherein said activating an illumination source comprises emitting some light directly toward the second mirror and reflecting by the second mirror the light directly received from the illumination source toward the window;
   capturing an image from the barcode target object within an imaging field of view with an imaging sensor having an array of photosensitive elements while the barcode target object is illuminated by the illumination light having an illumination field-of-view; and processing the image captured by the imaging sensor to decode the barcode target object.

10. The method of claim 9, wherein said activating an illumination source comprises emitting the illumination light from the housing interior to the barcode target object within an illumination field of view that covers the imaging field of view corresponding to the imaging sensor.

11. The method of claim 9, wherein said activating an illumination source comprises emitting some light directly toward the window.

12. The method of claim 9, wherein said activating an illumination source comprises emitting some light directly toward the window.

13. The method of claim 9, wherein the outer toroidal surface of the second mirror has a horizontal axis relative to the housing.

14. The method of claim 9, wherein the housing includes a portable housing configured for standing on top of a flat surface with a front face bounded by a first side wall, a second side wall, a top wall and a bottom wall.

15. The method of claim 14, wherein the window is located at the front face and substantially parallel to the front face.

16. The method of claim 14, further comprising:

a circuit board located inside the portable housing configured to hold the imaging sensor and the illumination source thereon, the circuit board being substantially parallel to the front face.

17. An apparatus comprising:

a housing;

a window on the housing;

an illumination source within the housing operative to generate an illumination light during imaging capture;

a first mirror having a shape of an toroidal surface with predominantly concave surface and located within the housing;

a second mirror having a shape of a toroidal surface with predominantly convex surface and located within the housing; and means for reflecting by the first mirror at least a portion of the light emitted by the illumination source toward the second mirror and for reflecting by the second mirror at least a portion of the light received from the first mirror toward the window to illuminate a barcode target object spaced from the housing;

means for reflecting by the second mirror at least a portion of the light directly received from the illumination source toward the window; and an imaging sensor having an array of photosensitive elements for capturing light scattered or reflected from the barcode target object within an imaging field of view corresponding to the imaging sensor while the barcode target object is illuminated by the illumination light having an illumination field-of-view.

18. The apparatus of claim 17, further comprises:

means for emitting some light directly toward the window.

19. The apparatus of claim 17, further comprises:

means for emitting some light directly toward the window.

\* \* \* \* \*